(12) United States Patent
Mueller

(10) Patent No.: US 6,705,534 B1
(45) Date of Patent: Mar. 16, 2004

(54) SHOWER CONTROL SYSTEM

(76) Inventor: Craig D. Mueller, 14510 40th Pl. N., Plymouth, MN (US) 55446

(*) Notice: Subject to any disclaimer, the term of this patent is extended or adjusted under 35 U.S.C. 154(b) by 62 days.

(21) Appl. No.: 10/122,847

(22) Filed: Apr. 12, 2002

(51) Int. Cl.$^7$ ............................................. G05D 23/13
(52) U.S. Cl. ...................... 236/12.12; 4/676; 236/12.15
(58) Field of Search ........................... 236/12.12, 12.15; 4/676, 677

(56) References Cited

U.S. PATENT DOCUMENTS

| | | | |
|---|---|---|---|
| 4,558,817 A | * | 12/1985 | Kiendl ..................... 236/12.12 |
| 4,563,780 A | * | 1/1986 | Pollack ........................... 4/668 |
| 4,654,900 A | * | 4/1987 | McGhee ........................ 4/670 |
| 4,674,678 A | * | 6/1987 | Knebel et al. ........... 236/12.12 |
| 4,756,030 A | * | 7/1988 | Juliver ........................... 4/668 |
| 4,923,116 A | | 5/1990 | Homan |
| 4,931,938 A | | 6/1990 | Hass |
| 5,060,323 A | | 10/1991 | Shaw |
| 5,255,844 A | * | 10/1993 | Miller et al. ............. 236/12.12 |
| 5,287,570 A | | 2/1994 | Peterson et al. |
| D356,511 S | | 3/1995 | Zeutzius |
| 5,979,776 A | | 11/1999 | Williams |
| 6,250,558 B1 | * | 6/2001 | Dogre Cuevas ......... 236/12.12 |
| 6,286,764 B1 | * | 9/2001 | Garvey et al. ........... 236/12.12 |
| 6,446,875 B1 | * | 9/2002 | Brooks et al. ........... 236/12.12 |

* cited by examiner

*Primary Examiner*—William E. Topolcai

(57) ABSTRACT

A shower control system for facilitating a user's control of the temperature and pressure of water used during a shower. The shower control system includes a shower assembly having a pair of inlet pipes. A first of the inlet pipes is designed for being in fluid communication with a building cold water supply. A second of the inlet pipes is designed for being in fluid communication with a building hot water supply. A stem pipe of the shower assembly is in fluid communication with the inlet pipes. A shower head of the shower assembly is in fluid communication with the stem pipe. A mixing assembly is operationally coupled to the shower assembly. The mixing assembly is designed for controlling pressure and temperature of water sprayed from the shower head. A power assembly is operationally coupled to the mixing assembly for providing power to the mixing assembly.

19 Claims, 4 Drawing Sheets

SHOWER CONTROL SYSTEM

BACKGROUND OF THE INVENTION

1. Field of the Invention

The present invention relates to automatic operating water faucets and more particularly pertains to a new shower control system for facilitating a user's control of the temperature and pressure of water used during a shower.

2. Description of the Prior Art

The use of automatic operating water faucets is known in the prior art. U.S. Pat. No. 5,060,323 describes a system for automatically dispensing water from a faucet when a user's hands are placed under the faucet. Another type of automatic operating water faucet is U.S. Pat. No. 4,923,116 having a motor and solenoids for controlling flow of water through the tub fill spout or the shower head. Another type of automatic operating water faucet is U.S. Pat. No. 4,931,938 having hot and cold water valves for mixing hot and cold water to be dispensed from a faucet. Another type of automatic operating water faucet is U.S. Pat. No. 5,979,776 having a temperature and flow controller allowing a desired temperature of water to be dispensed for a determinate amount of time. Another type of automatic operating water faucet is U.S. Pat. No. Des. 356,511 having a temperature control unit for controlling a temperature of the water to be dispersed. Another type of automatic operating water faucet is U.S. Pat. No. 5,287,570 having a control system for water faucets that has a control switch for allowing water to be dispensed from the faucets when the control switch is depressed by the body of the user.

While these devices fulfill their respective, particular objectives and requirements, the need remains for a system that includes features allow for the control of the pressure of water being dispensed.

SUMMARY OF THE INVENTION

The present invention meets the needs presented above by using a pair solenoids working in concert to restrict or increase the flow of the water being released to decrease or increase the pressure of the water being dispensed.

Still yet another object of the present invention is to provide a new shower control system that allows a user to control the rate at which water is being dispensed for a hard or soft shower.

Even still another object of the present invention is to provide a new shower control system that allows a user to visually see the difference between the actual water temperature and the desired temperature.

To this end, the present invention generally comprises a shower assembly having a pair of inlet pipes. A first of the inlet pipes is designed for being in fluid communication with a building cold water supply. A second of the inlet pipes is designed for being in fluid communication with a building hot water supply. A stem pipe of the shower assembly is in fluid communication with the inlet pipes. A shower head of the shower assembly is in fluid communication with the stem pipe whereby the shower head is designed for spraying water on a user. A mixing assembly is operationally coupled to the shower assembly. The mixing assembly is designed for controlling pressure and temperature of water sprayed from the shower head when the mixing assembly is actuated by the user. A power assembly is operationally coupled to the mixing assembly. The power assembly is designed for providing power to the mixing assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
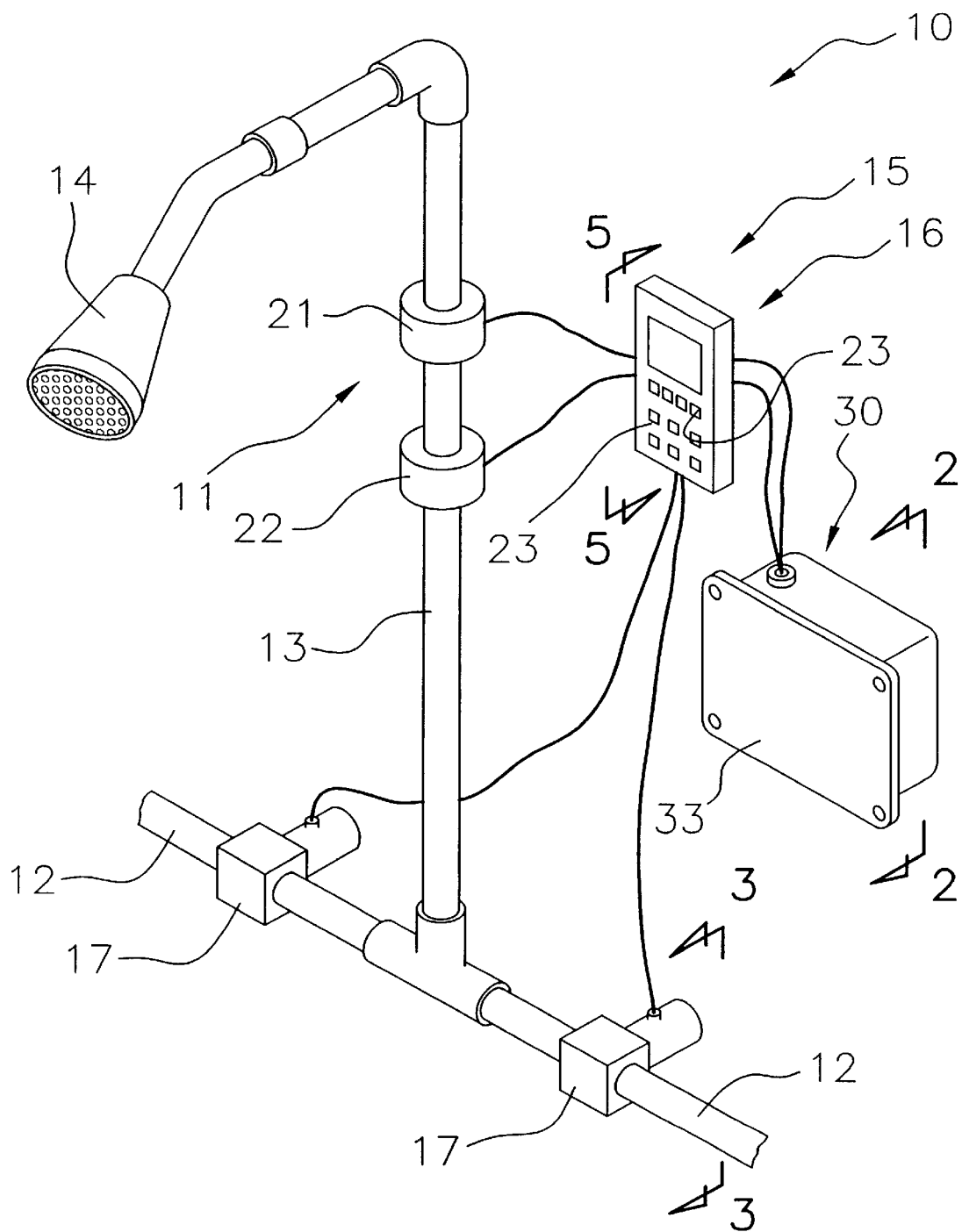
FIG. 1 is a perspective view of a new shower control system according to the present invention.
Figure 2:
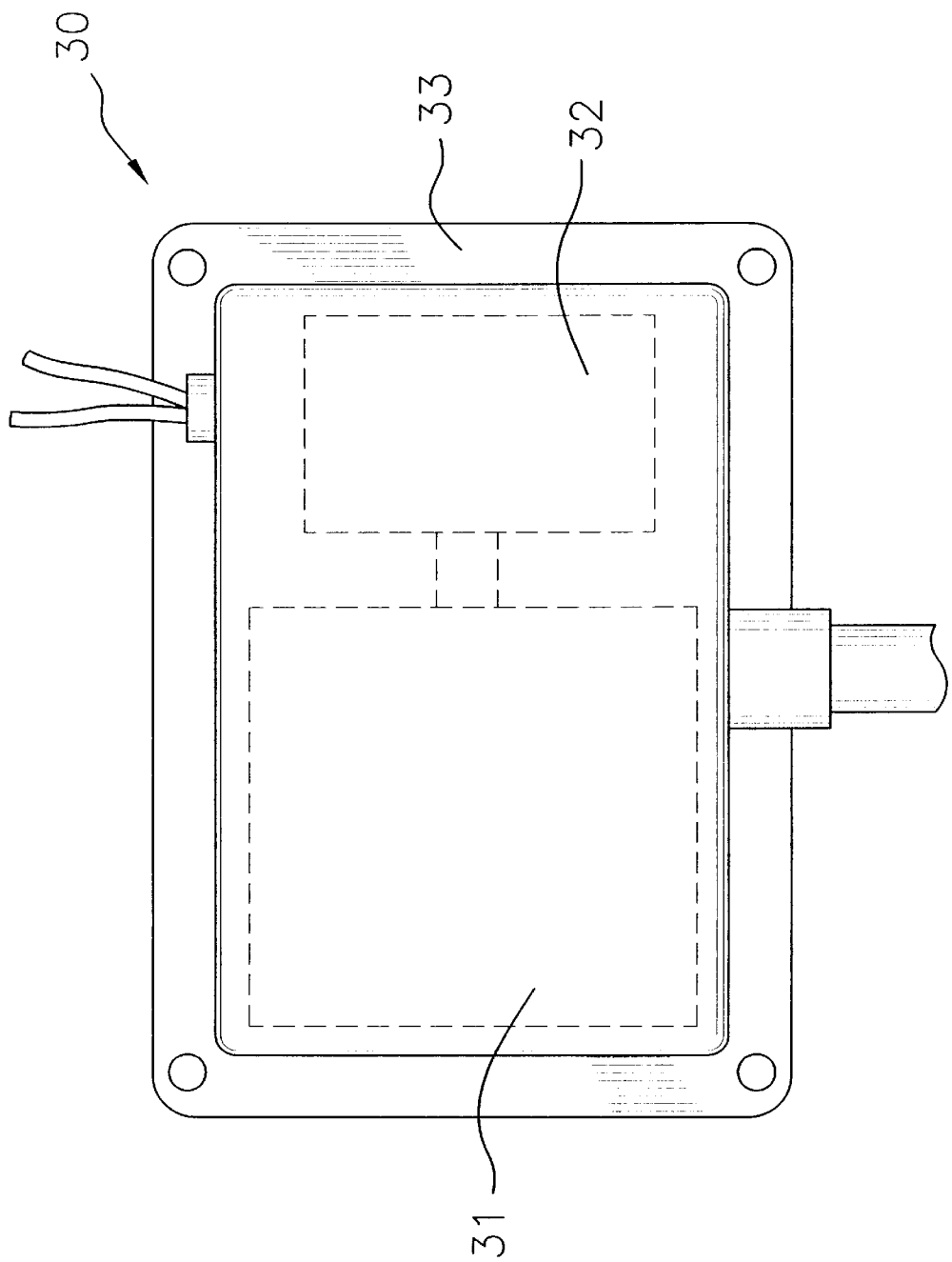
FIG. 2 is a front view of the power assembly of the present invention taken along line 2—2 of FIG. 1.
Figure 4:
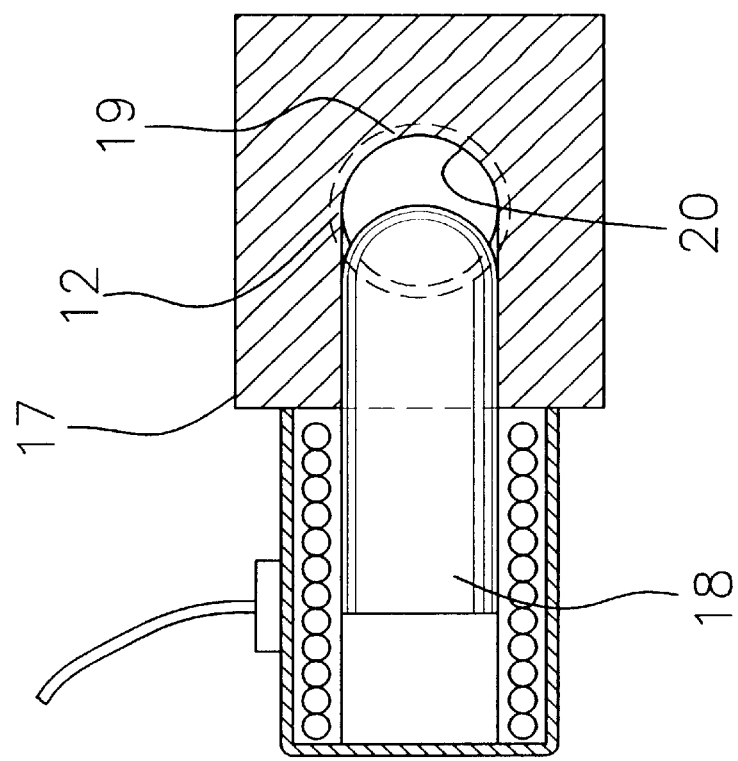
FIG. 4 is a cross-sectional view of one of the solenoids of the present invention taken along line 4—4 of FIG. 3.
Figure 3:
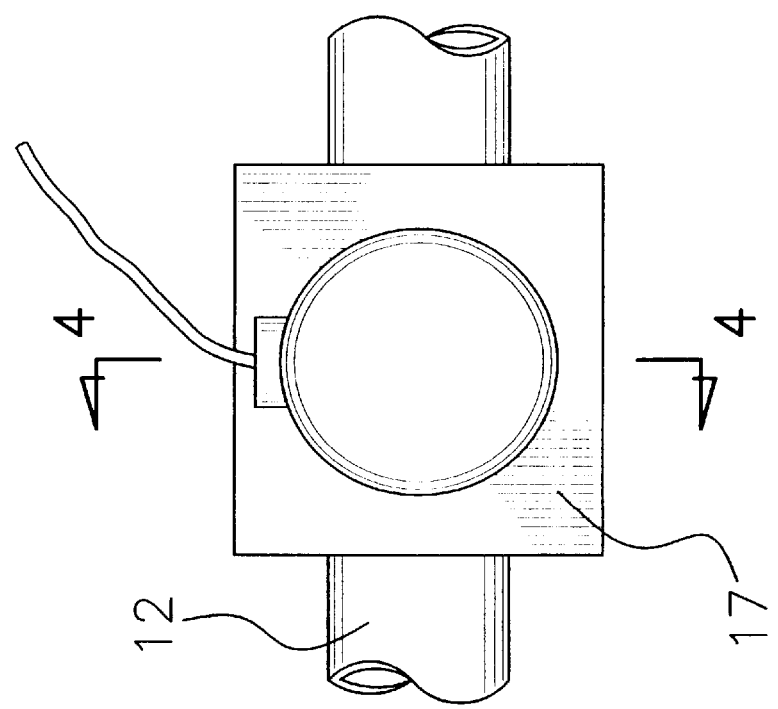
FIG. 3 is a detailed side view of one of the solenoids of the present invention taken along line 3—3 of FIG. 1.
Figure 5:
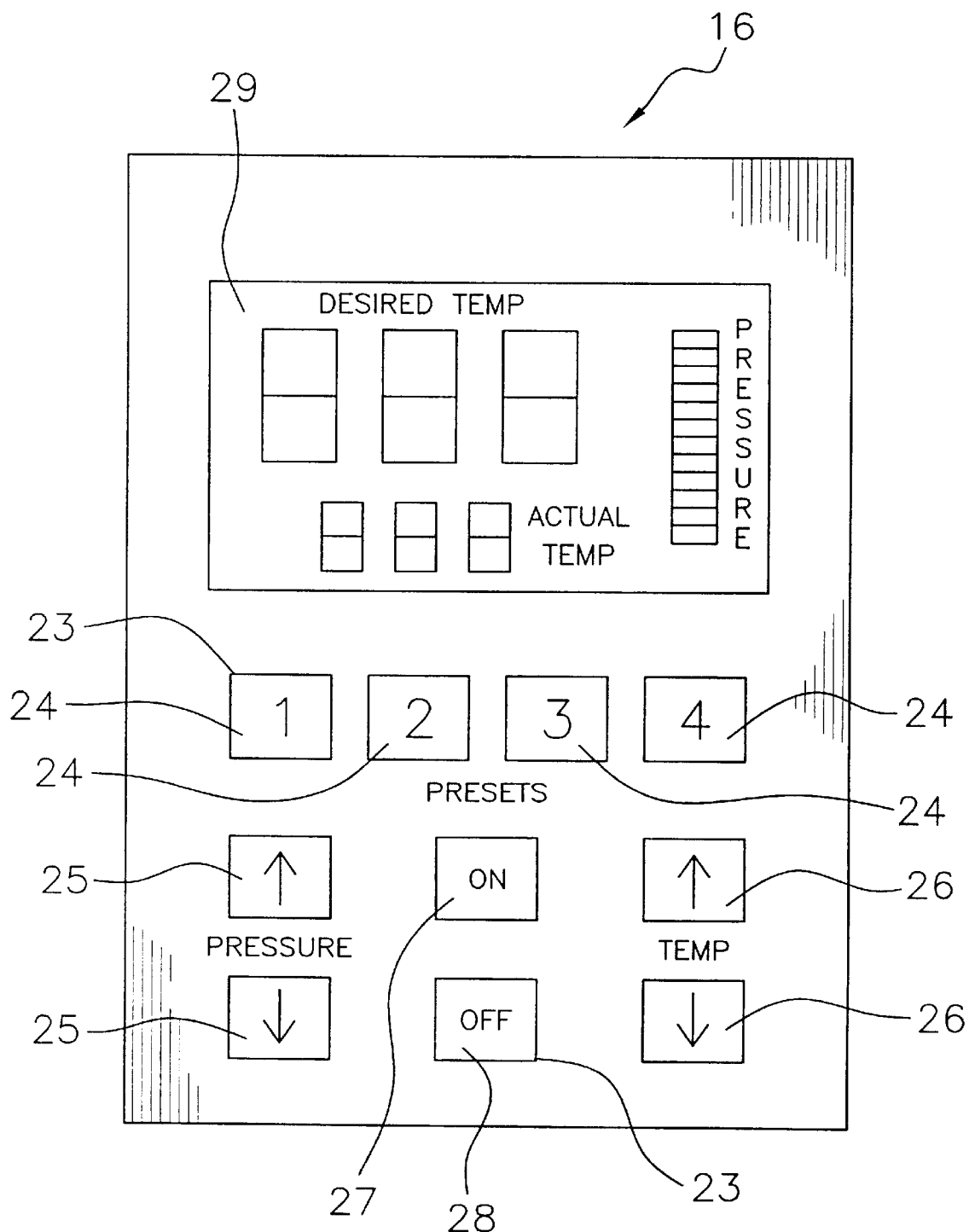
FIG. 5 is a detailed front view of the control assembly of the present invention taken along line 5—5 of FIG. 1.

With reference now to the drawings, and in particular to FIGS. 1 through 5 thereof, a new shower control system embodying the principles and concepts of the present invention and generally designated by the reference numeral 10 will be described.

As best illustrated in FIGS. 1 through 5, the shower control system 10 generally comprises a shower assembly 11 having a pair of inlet pipes 12. A first of the inlet pipes 12 is designed for being in fluid communication with a building cold water supply. A second of the inlet pipes 12 is designed for being in fluid communication with a building hot water supply. A stem pipe 13 of the shower assembly 11 is in fluid communication with the inlet pipes 12. A shower head 14 of the shower assembly 11 is in fluid communication with the stem pipe 13 whereby the shower head 14 is designed for spraying water on a user.

A mixing assembly 15 is operationally coupled to the shower assembly 11. The mixing assembly 15 is designed for controlling pressure and temperature of water sprayed from the shower head 14 when the mixing assembly 15 is actuated by the user. The mixing assembly 15 has a control assembly 16. The control assembly 16 is designed for being actuated by the user for controlling the temperature and pressure of the water is sprayed onto the user.

The mixing assembly 15 has a pair of solenoids 17. Each of the solenoids 17 is operationally coupled to the mixing assembly 15. A first of the solenoids 17 is operationally coupled to the first of the inlet pipes 12. The first of the solenoids 17 is designed for controlling the amount of water from the building cold water supply flowing through the first of the inlet pipes 12. A second of the solenoids 17 is operationally coupled to the second of the inlet pipes 12. The second of the solenoids 17 is designed for controlling the amount of water from the building hot water supply flowing through the second of the inlet pipes 12. Each of the solenoids 17 of the mixing assembly 15 has a ram 18. The ram 18 slidably extends through a side wall 19 and into a lumen 20 of an associated one of the inlet pipes 12. The ram 18 is designed for selectively restricting passage of water through the lumen 20 of the associated one of the inlet pipes 12.

The mixing assembly 15 has a temperature sensor 21. The temperature sensor 21 is operationally coupled to the control assembly 16. The temperature sensor 21 is operationally coupled to the stem pipe 13 of the shower assembly 11 whereby the temperature sensor 21 is designed for sensing a temperature of the water flowing through the stem pipe 13 of the shower assembly 11. The temperature sensor 21 is for relaying the temperature of the water to the control assembly 16 whereby the control assembly 16 controls the solenoids 17 for mixing the water to match a predetermined temperature.

The mixing assembly 15 has a pressure sensor 22. The pressure sensor 22 is operationally coupled to the control assembly 16. The pressure sensor 22 is operationally coupled to the stem pipe 13 of the shower assembly 11 whereby the pressure sensor 22 is designed for sensing a pressure of the water flowing through the stem pipe 13 of the shower assembly 11. The pressure sensor 22 is for relaying the pressure of the water to the control assembly 16 whereby the control assembly 16 controls the solenoids 17 for changing the rate of flow of the water to match a predetermined pressure.

The control assembly 16 of the mixing assembly 15 has a plurality of buttons 23. The buttons 23 are designed for being actuatable by the user whereby the buttons 23 are used to control the pressure and the temperature of the water sprayed on the user.

The buttons 23 of the control assembly 16 comprise a plurality of preset buttons 24. Each of the preset buttons 24 is designed for setting a predetermined unique temperature and pressure when one of the preset buttons 24 is actuated by the user.

The buttons 23 of the control assembly 16 comprises a pair of pressure buttons 25. A first of the pressure buttons 25 is designed for being actuated for increasing the pressure of the water sprayed on the user when the first of the pressure buttons 25 is actuated by the user. A second of the pressure buttons 25 is designed for being actuated for decreasing the pressure of the water sprayed on the user when the second of the pressure switches is actuated by the user.

The buttons 23 of the control assembly 16 comprise a pair of temperature buttons 26. A first of the temperature buttons 26 is designed for being actuated for increasing the temperature of the water sprayed on the user when the first of the temperature buttons 26 is actuated by the user. A second of the temperature buttons 26 is designed for being actuated for decreasing the temperature of the water sprayed on the user when the second of the temperature switches is actuated by the user.

The plurality of buttons 23 of the control assembly 16 comprise an on button 27. The on button 27 is actuatable whereby the on button 27 is designed for actuating the mixing assembly 15 to permit water to be sprayed on the user when the user actuates the on button 27.

The plurality of buttons 23 of the control assembly 16 comprise an off button 28. The off button 28 is actuatable whereby the off button 28 is designed for actuating the mixing assembly 15. to prevent water from being sprayed on the user when the user actuates the off button 28.

The control assembly 16 of the mixing assembly 15 has a display 29. The display 29 is designed for displaying the temperature of the water sprayed on the user. The display 29 is designed for displaying the desired temperature of the water to be sprayed on the user. The display 29 is designed for displaying the pressure of the water sprayed on the user.

A power assembly 30 is operationally coupled to the mixing assembly 15. The power assembly 30 is designed for providing power to the mixing assembly 15. The power assembly 30 has a transformer 31. The transformer 31 is positioned within a housing 33 of the power assembly 30 whereby the housing 33 is designed for preventing water from contacting the transformer 31. The transformer 31 is designed for coupling to a power supply of the building whereby the transformer 31 is for stepping down the power to be supplied to the mixing assembly 15. The power assembly 30 has a battery 32. The battery 32 is operationally coupled between the transformer 31 and the mixing assembly 15. The battery 32 is positioned within the housing 33 whereby the housing 33 is designed for preventing the battery 32 from is exposed to the water. The battery 32 is for s supplying power to the mixing assembly 15 when power from the power supply of the building is discontinued.

In use, the user positions themselves under the shower head 14 of the shower assembly 11. The on button 27 is then actuated and the mixing assembly 15 actuates t he ram 18 of each of the solenoids 17 to permit water to flow through the inlet pipes 12 to the shower head 14 to be spray ed on the user. The user can the actuate one of the pre set buttons 24 to have the mixing assembly 15 mix the water to a desired temperature and pressure. The mixing assembly 15 adjusts the ram 18 of each of the solenoids 17 to allow more less water to be released until the temperature sensor 21 senses the temperature is at the desired temperature. The mixing assembly 15 also actuates the ram 18 of each of the solenoids 17 to increase and decrease the total amount of water flowing through the stem pipe 13 until the pressure sensor 22 detects the desired pressure. In the alternative the user can actuate the first of the pressure buttons 25 to incrementally raise the pressure of the water or actuate the second of the pressure buttons 25 to incrementally decrease the pressure of the water. The user can also actuate the first of the temperature buttons 26 to incrementally increase the temperature of the water of actuate the second of the temperature buttons 26 to incrementally decrease the temperature of the water. The control assembly 16 actuates the ram 18 of the first of the solenoids 17 to permit more water to flow when a colder temperature is desired. The control assembly 16 actuates the ram 18 of the second of the solenoids 17 for permitting more water to flow when a warmer temperature is desired. The user can then actuate the off button 28 to have the mixing assembly 15 prevent water from being transferred to the shower head 14 when the user is done showering.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shower control system comprising:

a shower assembly having a pair of inlet pipes, a first of said inlet pipes being adapted for being in fluid communication with a building cold water supply, a second of said inlet pipes being adapted for being in fluid communication with a building hot water supply, a stem pipe of said shower assembly being in fluid communication with said inlet pipes, a shower head of said shower assembly being in fluid communication with said stem pipe such that said shower head is adapted for spraying water on a user;

a mixing assembly being operationally coupled to said shower assembly, said mixing assembly being adapted for controlling pressure and temperature of water sprayed from the shower head when said mixing assembly is actuated by the user;

a power assembly being operationally coupled to said mixing assembly, said power assembly being adapted for providing power to said mixing assembly; and said power assembly having a transformer said transformer being positioned within a housing of said power assembly such that said housing is adapted for preventing water from contacting said transformer said transformer being adapted for coupling to a power supply of the building such that said transformer is for stepping down the power to be supplied to said mixing assembly.

2. The shower control system as set forth in claim 1, further comprising:

said mixing assembly having a control assembly, said control assembly being adapted for being actuated by the user for controlling the temperature and pressure of the water being sprayed onto the user.

3. The shower control system as set forth in claim 2, further comprising:

said mixing assembly having a pair of solenoids, each of said solenoids being operationally coupled to said mixing assembly, a first of said solenoids being operationally coupled to said first of said inlet pipes, said first of said solenoids being adapted for controlling the amount of water from the building cold water supply flowing through said first of said inlet pipes, a second of said solenoids being operationally coupled to said second of said inlet pipes, said second of said solenoids being adapted for controlling the amount of water from the building hot water supply flowing through said second of said inlet pipes.

4. The shower control system as set forth in claim 3, further comprising:

said mixing assembly having a temperature sensor, said temperature sensor being operationally coupled to said control assembly, said temperature sensor being operationally coupled to said stem pipe of said shower assembly such that said temperature sensor is adapted for sensing a temperature of the water flowing through said stem pipe of said shower assembly, said temperature sensor being for relaying the temperature of the water to said control assembly such that said control assembly controls said solenoids for mixing the water to match a predetermined temperature.

5. The shower control system as set forth in claim 3, further comprising:

said mixing assembly having a pressure sensor, said pressure sensor being operationally coupled to said control assembly, said pressure sensor being operationally coupled to said stem pipe of said shower assembly such that said pressure sensor is adapted for sensing a pressure of the water flowing through said stem pipe of said shower assembly, said pressure sensor being for relaying the pressure of the water to said control assembly such that said control assembly controls said solenoids for changing the rate of flow of the water to match a predetermined pressure.

6. The shower control system as set forth in claim 2, further comprising:

said control assembly of said mixing assembly having a plurality of buttons, said buttons being adapted for being actuatable by the user such that said buttons are used to control the pressure and the temperature of the water being sprayed on the user.

7. The shower control system as set forth in claim 6, further comprising:

said buttons of said control assembly comprising a plurality of preset buttons, each of said preset buttons being adapted for setting a predetermined unique temperature and pressure when one of said preset buttons is actuated by the user.

8. The shower control system as set forth in claim 6, further comprising:

said buttons of said control assembly comprising a pair of pressure buttons, a first of said pressure buttons being adapted for being actuated for increasing the pressure of the water being sprayed on the user when said first of said pressure buttons is actuated by the user, a second of said pressure buttons being adapted for being actuated for decreasing the pressure of the water being sprayed on the user when said second of said pressure switches is actuated by the user.

9. The shower control system as set forth in claim 6, further comprising:

said buttons of said control assembly comprising a pair of temperature buttons, a first of said temperature buttons being adapted for being actuated for increasing the temperature of the water being sprayed on the user when said first of said temperature buttons is actuated by the user, a second of said temperature buttons being adapted for being actuated for decreasing the temperature of the water being sprayed on the user when said second of said temperature switches is actuated by the user.

10. The shower control system as set forth in claim 6, further comprising:

said plurality of buttons of said control assembly comprising an on button, said on button being actuatable such that said on button is adapted for actuating said mixing assembly to permit water to be sprayed on the user when the user actuates said on button; and said plurality of buttons of said control assembly comprising an off button, said off button being actuatable such that said off button is adapted for actuating said mixing assembly to prevent water from being sprayed on the user when the user actuates said off button.

11. The shower control system as set forth in claim 2, further comprising:

said control assembly of said mixing assembly having a display, said display being adapted for displaying the temperature of the water being sprayed on the user, said display being adapted for displaying the desired temperature of the water to be sprayed on the user, said display being adapted for displaying the pressure of the water being sprayed on the user.

12. The shower control system as set forth in claim 3, further comprising:

each of said solenoids of said mixing assembly having a ram, said ram slidably extending through a side wall and into a lumen of an associated one of said inlet pipes, said ram being adapted for selectively restricting passage of water through said lumen of the associated one of said inlet pipes.

13. The shower control system as set forth in claim 1, further comprising:

said power assembly having a battery, said battery being operationally coupled between said transformer and said mixing assembly, said battery being positioned within said housing such that said housing is adapted for preventing said battery from being exposed to the water, said battery being for supplying power to said mixing assembly when power from the power supply of the building is discontinued.

14. A The shower control system as set forth in claim 1, further comprising:

said mixing assembly having a control assembly, said control assembly being adapted for being actuated by the user for controlling the temperature and pressure of the water being sprayed onto the user;

said mixing assembly having a pair of solenoids, each of said solenoids being operationally coupled to said mixing assembly, a first of said solenoids being operationally coupled to said first of said inlet pipes, said first of said solenoids being adapted for controlling the amount of water from the building cold water supply flowing through said first of said inlet pipes, a second of said solenoids being operationally coupled to said second of said inlet pipes, said second of said solenoids being adapted for controlling the amount of water from the building hot water supply flowing through said second of said inlet pipes;

said mixing assembly having a temperature sensor, said temperature sensor being operationally coupled to said control assembly, said temperature sensor being operationally coupled to said stem pipe of said shower assembly such that said temperature sensor is adapted for sensing a temperature of the water flowing through said stem pipe of said shower assembly, said temperature sensor being for relaying the temperature of the water to said control assembly such that said control assembly controls said solenoids for mixing the water to match a predetermined temperature;

said mixing assembly having a pressure sensor, said pressure sensor being operationally coupled to said control assembly, said pressure sensor being operationally coupled to said stem pipe of said shower assembly such that said pressure sensor is adapted for sensing a pressure of the water flowing through said stem pipe of said shower assembly, said pressure sensor being for relaying the pressure of the water to said control assembly such that said control assembly controls said solenoids for changing the rate of flow of the water to match a predetermined pressure;

said control assembly of said mixing assembly having a plurality of buttons, said buttons being adapted for being actuatable by the user such that said buttons are used to control the pressure and the temperature of the water being sprayed on the user;

said buttons of said control assembly comprising a plurality of preset buttons, each of said preset buttons being adapted for setting a predetermined unique temperature and pressure when one of said preset buttons is actuated by the user;

said buttons of said control assembly comprising a pair of pressure buttons, a first of said pressure buttons being adapted for being actuated for increasing the pressure of the water being sprayed on the user when said first of said pressure buttons is actuated by the user, a second of said pressure buttons being adapted for being actuated for decreasing the pressure of the water being sprayed on the user when said second of said pressure switches is actuated by the user;

said buttons of said control assembly comprising a pair of temperature buttons, a first of said temperature buttons being adapted for being actuated for increasing the temperature of the water being sprayed on the user when said first of said temperature buttons is actuated by the user, a second of said temperature buttons being adapted for being actuated for decreasing the temperature of the water being sprayed on the user when said second of said temperature switches is actuated by the user;

said plurality of buttons of said control assembly comprising an on button, said on button being actuatable such that said on button is adapted for actuating said mixing assembly to permit water to be sprayed on the user when the user actuates said on button;

said plurality of buttons of said control assembly comprising an off button, said off button being actuatable such that said off button is adapted for actuating said mixing assembly to prevent water from being sprayed on the user when the user actuates said off button;

said control assembly of said mixing assembly having a display, said display being adapted for displaying the temperature of the water being sprayed on the user, said display being adapted for displaying the desired temperature of the water to be sprayed on the user, said display being adapted for displaying the pressure of the water being sprayed on the user;

each of said solenoids of said mixing assembly having a ram, said ram slidably extending through a side wall and into a lumen of an associated one of said inlet pipes, said ram being adapted for selectively restricting passage of water through said lumen of the associated one of said inlet pipes; and said power assembly having a battery, said battery being operationally coupled between said transformer and said mixing assembly, said battery being positioned within said housing such that said housing is adapted for preventing said battery from being exposed to the water, said battery being for supplying power to said mixing assembly when power from the power supply of the building is discontinued.

15. A shower control system comprising:

a shower assembly having a pair of inlet pipes, a first of said inlet pipes being adapted for being in fluid communication with a building cold water supply, a second of said inlet pipes being adapted for being in fluid communication with a building hot water supply, a stem pipe of said shower assembly being in fluid communication with said inlet pipes, a shower head of said shower assembly being in fluid communication with said stem pipe such that said shower head is adapted for spraying water on a user;

a mixing assembly being operationally coupled to said shower assembly, said mixing assembly being adapted for controlling pressure and temperature of water sprayed from the shower head when said mixing assembly is actuated by the user;

a power assembly being operationally coupled to said mixing assembly, said power assembly being adapted for providing power to said mixing assembly;

said mixing assembly having a control assembly, said control assembly being adapted for being actuated by the user for controlling the temperature and pressure of the water being sprayed onto the user;

a said mixing assembly having a pair of solenoids, each of said solenoids being operationally coupled to said mixing assembly, a first of said solenoids being operationally coupled to said first of said inlet pipes, said first of said solenoids being adapted for controlling the amount of water from the building cold water supply flowing through said first of said inlet pipes, a second of said solenoids being operationally coupled to said second of said inlet pipes, said second of said solenoids being adapted for controlling the amount of water from the building hot water supply flowing through said second of said inlet pipes; and each of said solenoids of said mixing assembly having a ram, said ram slidably extending through a side wall and into a lumen of an associated one of said inlet pipes, said ram being adapted for selectively restricting passage of water through said lumen of the associated one of said inlet pipes.

16. A shower control system comprising:

a shower assembly having a pair of inlet pipes, a first of said inlet pipes being adapted for being in fluid communication with a building cold water supply, a second of said inlet pipes being adapted for being in fluid communication with a building hot water supply, a stem pipe of said shower assembly being in fluid communication with said inlet pipes, a shower head of said shower assembly being in fluid communication with said stem pipe such that said shower head is adapted for spraying water on a user;

a mixing assembly being operationally coupled to said shower assembly, said mixing assembly being adapted for controlling pressure and temperature of water sprayed from the shower head when said mixing assembly is actuated by the user;

a power assembly being operationally coupled to said mixing assembly, said power assembly being adapted for providing power to said mixing assembly;

said mixing assembly having a control assembly, said control assembly being adapted for being actuated by the user for controlling the temperature and pressure of the water being sprayed onto the user;

said control assembly of said mixing assembly having a plurality of buttons, said buttons being adapted for being actuatable by the user such that said buttons are used to control the pressure and the temperature of the water being sprayed on the user; and said buttons of said control assembly comprising a pair of pressure buttons, a first of said pressure buttons being adapted for being actuated for increasing the pressure of the water being sprayed on the user when said first of said pressure buttons is actuated by the user, a second of said pressure buttons being adapted for being actuated for decreasing the pressure of the water being sprayed on the user when said second of said pressure switches is actuated by the user.

17. The shower control system as set forth in claim 16, further comprising:

said buttons of said control assembly comprising a plurality of preset buttons, each of said preset buttons being adapted for setting a predetermined unique temperature and pressure when one of said preset buttons is actuated by the user.

18. The shower control system as set forth in claim 16, further comprising:

said buttons of said control assembly comprising a pair of temperature buttons, a first of said temperature buttons being adapted for being actuated for increasing the temperature of the water being sprayed on the user when said first of said temperature buttons is actuated by the user, a second of said temperature buttons being adapted for being actuated for decreasing the temperature of the water being sprayed on the user when said second of said temperature switches is actuated by the user.

19. The shower control system as set forth in claim 16, further comprising:

said plurality of buttons of said control assembly comprising an on button, said on button being actuatable such that said on button is adapted for actuating said mixing assembly to permit water to be sprayed on the user when the user actuates said on button; and said plurality of buttons of said control assembly comprising an off button, said off button being actuatable such that said off button is adapted for actuating said mixing assembly to prevent water from being sprayed on the user when the user actuates said off button.

* * * * *